(No Model.)

W. RICHARDS.
FRICTION PULLEY FOR SAND REELS.

No. 492,632. Patented Feb. 28, 1893.

Witnesses:

Inventor:
Wm. Richards.
By Edson Bros,
his Atty's.

UNITED STATES PATENT OFFICE.

WILLIAM RICHARDS, OF MAYBURG, PENNSYLVANIA.

FRICTION-PULLEY FOR SAND-REELS.

SPECIFICATION forming part of Letters Patent No. 492,632, dated February 28, 1893.

Application filed March 10, 1892. Serial No. 424,391. (No model.)

*To all whom it may concern:*

Be it known that I, WILLIAM RICHARDS, a citizen of the United States, residing at Mayburg, in the county of Forest and State of Pennsylvania, have invented certain new and useful Improvements in Friction-Pulleys for Sand-Reels; and I do hereby declare the following to be a full, clear, and exact description of the invention, such as will enable others skilled in the art to which it appertains to make and use the same.

My present invention relates to improvements in sand reels of the class shown and described in my prior United States Patent, No. 413,733, dated October 29, 1889; the object in view is to provide a friction pulley for sand reels which will be lighter in weight, require less material, and be cheaper to manufacture than friction pulleys as ordinarily constructed, whereby the weight and cost of manufacturing the reel can be reduced.

With these ends in view, my invention consists of the peculiar construction and arrangement of parts as will be hereinafter fully pointed out and claimed.

Figure 1:
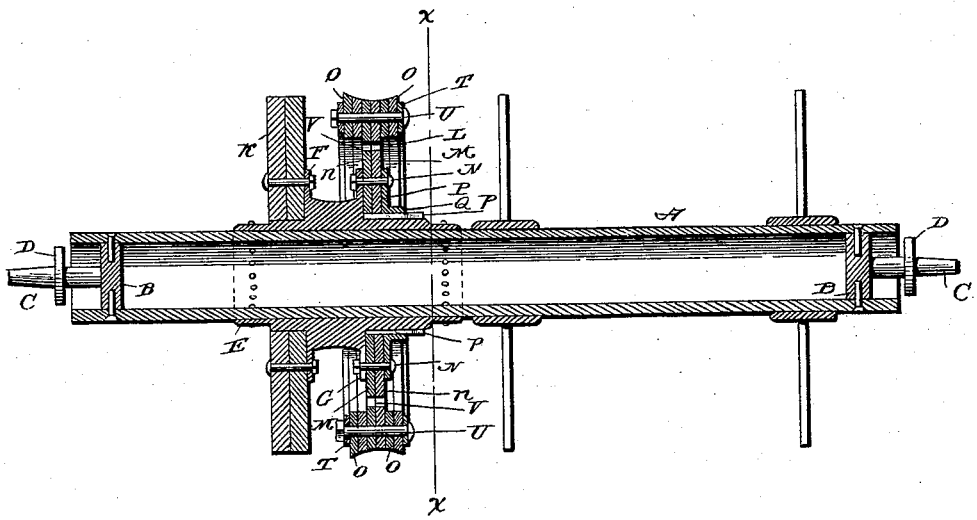
Figure 2:
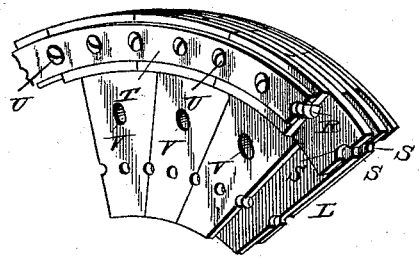
Figure 3:
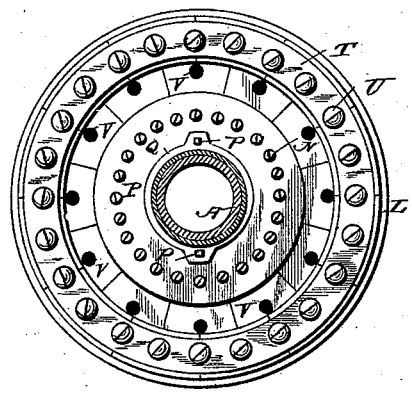

In the accompanying drawings, Figure 1 is a longitudinal sectional view through a sand reel provided with my improved friction pulley. Fig. 2 is a view of a segment of the friction pulley. Fig. 3 is a transverse sectional view on the line $x$—$x$ of Fig. 1.

Like letters of reference denote corresponding parts in the several figures of the drawings, referring to which:—

A designates the tubular body of the reel; and disks, B, are secured within said tubular body, A, near the ends thereof. Each of the disks B is provided with an outwardly extending gudgeon, C, each gudgeon being provided with a collar D.

On the shaft or body A, is secured, in any suitable manner, a casting E, which is provided with two parallel annular flanges F, G. The flanges F, G, are connected by a web H, and to the flange F is securely bolted a brake pulley K. The friction pulley L, is secured to the flange, G, by means of bolts N as will be hereinafter pointed out. The friction pulley L, is, preferably, constructed of a series of segments, M, which extend continuously from the hub to the rim or periphery of the pulley, and a series of shorter segments, O, secured to the segments M, near the outer ends thereof, said segments M, O, being arranged to break joints with each other, as shown in Fig. 2. One side of the pulley, L, is arranged to bear closely against the side of the flange G, and a detachable plate or flange P is adapted to be brought into close contact with the segments M. This detachable flange or plate P, is provided with a short hub, Q, and the hub and flange are grooved to receive feathers or keys, $p$, secured on the casting E, whereby the flange, P, is prevented from moving on said casting. The segments M, of the friction pulley, L, are held together and to the flange G, by means of bolts N, and these bolts are arranged to pass through the center of one segment and the adjacent edges of the two segments on the other side. To permit of this manner of fastening the segments together, each of the segments is provided with a central aperture, R, and a circular recess, S, in its edges the recesses, S, in adjacent segments forming an aperture which aligns with the central aperture in the segment in rear thereof, see Fig. 2. The segments O, are secured to the segments M, near the outer ends thereof, by means of spikes, or in any other suitable manner and said segments are further attached to the segments, M, and the pulley L, strengthened by means of metallic rings or washers, T, arranged against the sides of the sections O, and united by bolts U. The segments, O, break joints as do the segments M, so that the bolts U, pass through an aperture formed by coincidence of the circular recesses in adjacent outer segments, then through a central aperture in the segment O, lying against the segments M, then through an aperture formed by meeting of circular recesses in edges of two adjacent segments, M, &c. It will be noticed that the detachable flange, P, does not extend from the hub of the pulley L to the lower edges of the segments O, but that a short portion, $n$, of the segments M, is not covered by said flange P. In the uncovered portion, $n$, of the segments M, is formed a series of apertures V which allow air to pass freely through the pulley and thus keep the same dry and free from moisture.

The rings or washers, T, can be used with advantage on pulleys constructed of a series of wooden sections laid crosswise and having a rim spiked on.

Having thus fully described my invention, what I claim as new, and desire to secure by Letters Patent, is—

A pulley, consisting of a hub, the radial sections M arranged to break joints with each other, a series of segmental plates O arranged on opposite sides of the radial sections M and to break joints with each other and with said radial sections, the rings T attached to the faces of the plates O, within the periphery of the pulley, by bolts which extend through the segmental plates and radial sections, and a detachable flange arranged to bear against the radial sections between the hub and the ring T, substantially as described.

In testimony whereof I affix my signature in presence of two witnesses.

WILLIAM RICHARDS.

Witnesses:
A. B. DEAN,
R. Z. GILLESPIE.